(12) United States Patent
Kim et al.

(10) Patent No.: US 11,650,070 B2
(45) Date of Patent: May 16, 2023

(54) METHOD, APPARATUS, AND COMPUTER PROGRAM FOR GENERATING ROAD NETWORK DATA FOR AUTONOMOUS DRIVING VEHICLE

(71) Applicant: RideFlux Inc., Jeju-si (KR)

(72) Inventors: Jiwoong Kim, Jeju-si (KR); Junghee Park, Jeju-si (KR); Hawook Jeong, Jeju-si (KR); Himchan Cho, Hanam-si (KR)

(73) Assignee: RideFlux Inc., Jeju-si (KR)

( * ) Notice: Subject to any disclaimer, the term of this patent is extended or adjusted under 35 U.S.C. 154(b) by 0 days.

(21) Appl. No.: 17/362,522

(22) Filed: Jun. 29, 2021

(65) Prior Publication Data

US 2021/0404835 A1 Dec. 30, 2021

(30) Foreign Application Priority Data

Jun. 29, 2020 (KR) .................. 10-2020-0079115

(51) Int. Cl.
*G01C 21/36* (2006.01)
*G01C 21/32* (2006.01)

(52) U.S. Cl.
CPC ......... *G01C 21/3658* (2013.01); *G01C 21/32* (2013.01); *G01C 21/3641* (2013.01); *G01C 21/3673* (2013.01)

(58) Field of Classification Search
CPC ................ G01C 21/3658; G01C 21/32; G01C 21/3641; G01C 21/3673
See application file for complete search history.

(56) References Cited

U.S. PATENT DOCUMENTS

| | | | |
|---|---|---|---|
| 2013/0328924 A1 | 12/2013 | Arikan et al. | |
| 2019/0103019 A1* | 4/2019 | Fowe | G08G 1/0112 |
| 2019/0301872 A1* | 10/2019 | Jin | G01C 21/32 |
| 2020/0226925 A1 | 7/2020 | Zeng et al. | |

(Continued)

FOREIGN PATENT DOCUMENTS

| | | |
|---|---|---|
| CN | 109976332 A | 7/2019 |
| CN | 110196056 A | 9/2019 |

(Continued)

OTHER PUBLICATIONS

The extended European search report issued by the European Patent Office dated Apr. 26, 2022, which corresponds to European Patent Application No. 21181960.2-1009 and is related to U.S. Appl. No. 17/362,522.

(Continued)

*Primary Examiner* — Anne Marie Antonucci
*Assistant Examiner* — Jared C Bean
(74) *Attorney, Agent, or Firm* — Studebaker & Brackett PC

(57) ABSTRACT

Provided are a method, an apparatus, and a computer program for generating road network data for an autonomous driving vehicle. The method of generating road network data for an autonomous driving vehicle, which is performed by a computing device, the method includes generating one or more roads by grouping a plurality of unit lanes, generating connection information about the one or more roads, and generating road network data including road graphs generated by graphing the one or more roads and reflecting the connection information on the graphed one or more roads.

10 Claims, 16 Drawing Sheets

(56) References Cited

U.S. PATENT DOCUMENTS

| | | | | |
|---|---|---|---|---|
| 2021/0164787 A1* | 6/2021 | Soni | .................. | G01C 21/3804 |
| 2022/0001872 A1* | 1/2022 | Taieb | .................... | B60W 40/06 |
| 2022/0035378 A1* | 2/2022 | Levi | ......................... | G06T 7/70 |

FOREIGN PATENT DOCUMENTS

| | | |
|---|---|---|
| KR | 10-2017-0082165 A | 7/2017 |
| KR | 10-2019-0067233 A | 6/2019 |
| WO | 2020/078015 A1 | 4/2020 |

OTHER PUBLICATIONS

An Office Action mailed by the Korean Intellectual Property Office dated Dec. 30, 2021, which corresponds to Korean Patent Application No. 10-2020-0079115 and is related to U.S. Appl. No. 17/362,522.

\* cited by examiner

METHOD, APPARATUS, AND COMPUTER PROGRAM FOR GENERATING ROAD NETWORK DATA FOR AUTONOMOUS DRIVING VEHICLE

CROSS-REFERENCE TO RELATED APPLICATION

This application claims priority to and the benefit of Korean Patent Application No. 2020-0079115, filed on Jun. 29, 2020, the disclosure of which is incorporated herein by reference in its entirety.

BACKGROUND

1. Field of the Invention

Various embodiments of the present invention relate to a method, an apparatus, and a computer program for generating road network data for an autonomous driving vehicle.

2. Discussion of Related Art

For convenience of users driving vehicles, various types of sensors and electronic devices (e.g., advanced driver-assistance systems (ADAS)) are being provided, and in particular, technological development for an autonomous driving system of a vehicle is being actively conducted.

Here, the autonomous driving system refers to a vehicle that recognizes a surrounding environment without driver's intervention and automatically travels to a given destination by itself according to the recognized surrounding environment.

Generally, in the case of an autonomous driving system, various pieces of prior information are required to perform various purposes, such as providing a route to an autonomous driving vehicle and the like. Particularly, road network data including information about lanes and lane boundaries of roads is prior information that is usable in various modules included in the autonomous driving system and thus is essential data. Therefore, it is necessary to provide a process of generating the road network data.

SUMMARY OF THE INVENTION

The present invention is directed to providing an autonomous driving system capable of generating road network data, which is prior information necessary for performing various purposes, such as providing a route to an autonomous driving vehicle and the like, that is, is directed to providing a method, an apparatus, and a computer program for generating road network data for an autonomous driving vehicle.

Objects of the present invention are not limited to the above-described objects and other objects which have not been described may be clearly understood by those skilled in the art from the above descriptions.

According to an aspect of the present invention, there is provided a method of generating road network data for an autonomous driving vehicle, which is performed by a computing device, the method includes generating one or more roads by grouping a plurality of unit lanes, generating connection information about the one or more roads, and generating road network data including road graphs generated by graphing the one or more roads and reflecting the connection information on the graphed one or more roads.

The generating of the one or more roads may include analyzing image data including the plurality of unit lanes and identifying a lane boundary, in response to the identified lane boundary being a lane boundary in a form of a dotted line, grouping the plurality of unit lanes such that a first unit lane and a second unit lane adjacent to each other based on the lane boundary in the form of a dotted line are included in the same road, and in response to the identified lane boundary being a lane boundary in a form of a solid line, grouping the plurality of unit lanes such that a third unit lane and a fourth unit lane adjacent to each other based on the lane boundary in the form of a solid line are included in different roads.

The generating of the one or more roads may include, when a vehicle is located in a first unit lane among the plurality of unit lanes and travels along a preset traveling route and when the vehicle changes lanes from the first unit lane to each of the plurality of unit lanes, determining whether a change occurs in the preset traveling route, and grouping one or more of the unit lanes, in which a change in the preset traveling route does not occur among the plurality of unit lanes, and the first unit lane to be included in the same road and grouping one or more unit lanes, in which a change occurs in the preset traveling route, among the plurality of unit lanes, and the first unit lane to be included in different roads.

The generating of the one or more roads may include obtaining a map image for a predetermined area, analyzing the map image and identifying one or more road edges indicating the road, and separating the identified one or more edges from each other in a longitudinal direction and extracting two roads in which traveling directions of a vehicle are opposite to each other for each of the identified one or more edges.

The generating of the one or more roads may include grouping the plurality of unit lanes on the basis of attributes of the plurality of unit lanes, wherein the grouping of the plurality of unit lanes may include, when a first unit lane among the plurality of unit lanes included in a first road is a bus-only lane during a period from a first time to a second time, allowing the first unit lane to be excluded from the first road during the period from the first time to the second time and allowing the first unit lane to be included in the first road during a period excluding the period from the first time to the second time.

The generating of the one or more roads may include determining whether a traveling direction of a vehicle in a first road is the same as a traveling direction of the vehicle in a second road connected to the first road, and when it is determined that the traveling directions of the vehicle are the same, grouping the first road and the second road as a first road group, and determining whether the traveling direction of the vehicle in the second road is the same as a traveling direction of the vehicle in a third road connected to the second road, and when it is determined that the traveling direction of the vehicle are the same, allowing the third road to be included in the first road group.

The generating of the connection information may include determining whether travel is allowed between a first road and a second road adjacent to the first road and generating a connection information indicator between the first road and the second road according to the determination of whether travel is allowed, wherein the generating of the road network data may include displaying the connection information indicator at a position where the first road and the second road are connected on a first road graph corresponding to the first road and a second road graph corresponding to the second road.

The generating of the road network data may include generating road graphs including an L-axis in a longitudinal direction and an S-axis in a transverse direction (or an S-axis in the longitudinal direction and an L-axis in the transverse horizontal direction) for the one or more roads, wherein the generating of the road graphs may include selecting a reference unit lane from among the plurality of unit lanes included in a first road and connecting a start point ($S_0$) of the selected reference unit lane to an end point ($S_f$) of the reference unit lane with a straight line in a form of a solid line where $L=L_1$, and connecting a start point ($S_1$) of a first unit lane adjacent to the reference unit lane to an end point ($S_f$) of the first unit lane with a straight line in a form of a solid line where $L=L_2$, wherein, when a size of S coordinates of the start point ($S_1$) of the first unit lane is greater than a size of S coordinates of the start point ($S_0$) of the reference unit lane, displaying a section from $S_0$ to $S_1$ on the straight line where $L=L_2$ with a straight line in a form of a dotted line.

The generating of the road network data may include obtaining information about areas in which a vehicle is allowed to actually travel with respect to the plurality of unit lanes included in the one or more roads, and correcting the road graphs corresponding to the one or more roads on the basis of the information about the areas in which the vehicle is allowed to actually travel or displaying the information about the areas in which the vehicle is able to actually travel on the road graphs.

According to another aspect of the present invention, there is provided a device for performing the method generating road network data for an autonomous driving vehicle, which includes a memory configured to store one or more instructions, and a processor configured to execute the one or more instructions stored in the memory, wherein the processor executes the one or more instructions so that the method of generating road network data for an autonomous driving vehicle according to an embodiment of the present invention may be performed.

According to still aspect of the present invention, there is provided a computer program that is combined with a computer, which is hardware, and stored in a computer-readable recording medium so that the method of generating road network data for an autonomous driving vehicle according to an embodiment of the present invention may be performed.

Other specific details of the present invention are included in detailed descriptions and drawings.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
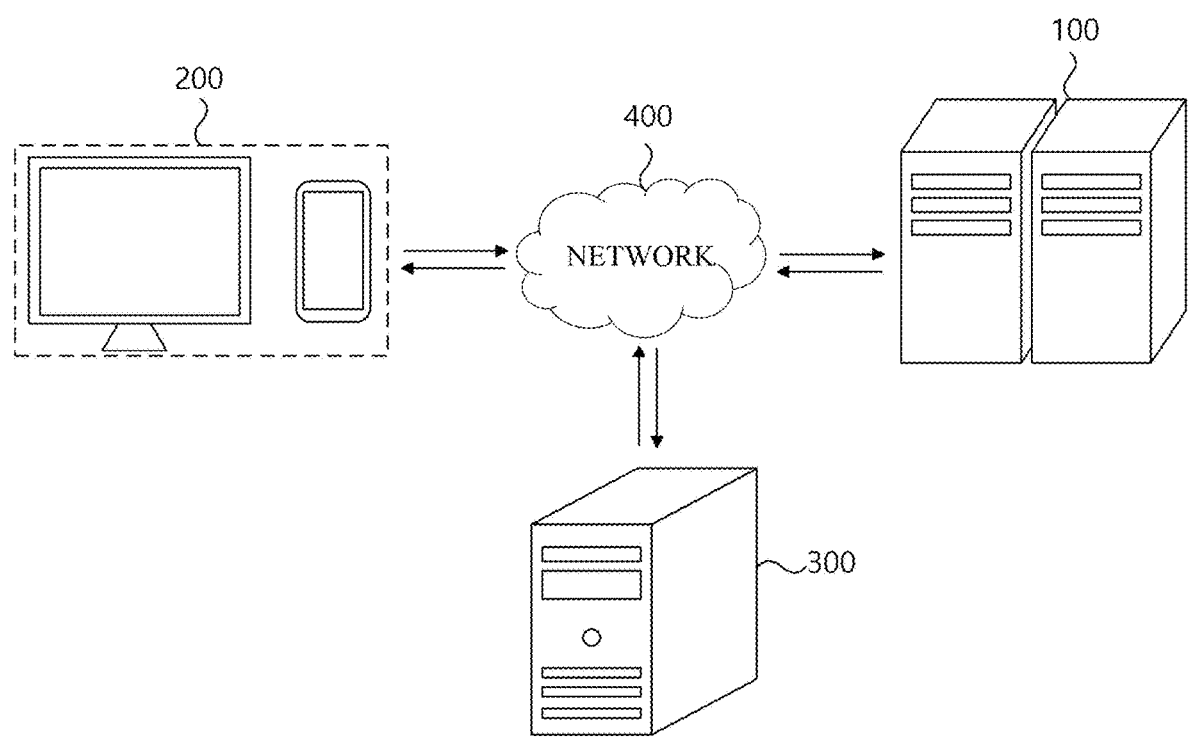
FIG. 1 is a diagram illustrating a system for generating road network data for an autonomous driving vehicle according to an embodiment of the present invention.

Advantages and features of the present invention and methods of achieving the same will be clearly understood with reference to the accompanying drawings and embodiments described in detail below. However, the present invention is not limited to the embodiments to be disclosed below but may be implemented in various different forms. The embodiments are provided in order to fully explain the present embodiments and fully describe the scope of the present invention for those skilled in the art. The scope of the present invention is only defined by the appended claims.

Terms used in this specification are considered in a descriptive sense only and not for purposes of limitation. In this specification, singular forms include plural forms unless the context clearly indicates otherwise. It will be understood that terms "comprise" and/or "comprising," when used herein, specify some stated components but do not preclude the presence or addition of one or more other components. Like reference numerals indicate like components throughout the specification and the term "and/or" includes each and all combinations of one or more referents. It should be understood that, although the terms "first," "second," etc. may be used herein to describe various components, these components are not limited by these terms. The terms are only used to distinguish one component from another component. Therefore, it should be understood that a first component to be described below may be a second component within the technical scope of the present invention.

Unless otherwise defined, all terms (including technical and scientific terms) used herein can be used as is customary in the art to which the present invention belongs. Also, it will be further understood that terms, such as those defined in commonly used dictionaries, will not be interpreted in an idealized or overly formal sense unless expressly so defined herein.

Terms described in the specification such as "unit" or "module" refer to software or a hardware component such as a field-programmable gate array (FPGA) or an application-specific integrated circuit (ASIC), and the "unit" or the "module" performs certain functions. However, the "unit" or the "module" is not limited to software or hardware. The "unit" or the "module" may be configured to be in an addressable storage medium or may be configured to be executed by at least one processor. Therefore, examples of the "unit" or the "module" include components such as software components, object-oriented software components, class components and task components, and processes, functions, attributes, procedures, subroutines, segments of program code, drivers, firmware, micro code, circuits, data, databases, data structures, tables, arrays, and variables. Components and functions provided in "units" or "modules" may be combined into a smaller number of components and "units" or "modules" or may be further separated into additional components and "units" or "modules."

The spatially-relative terms such as "below," "beneath," "lower," "above," and "upper" may be used herein for ease of description to describe the relationship of one element or components with another element(s) or component(s) as illustrated in the drawings. Spatially relative terms should be understood to include different directions of the element during use or operation in addition to the direction illustrated in the drawing. For example, if the element in the drawings is turned over, elements described as "below" or "beneath" other elements would then be oriented "above" the other elements. Therefore, an exemplary term "below" may encompass both orientations of above and below. Elements may also be oriented in other orientations, and thus spatially relative terms may be interpreted according to orientation.

In this specification, a computer refers to any type of hardware device including at least one processor and may be understood as a comprehensive meaning that includes software configurations operating in the corresponding hardware device according to embodiments. For example, the computer may be understood as a meaning that includes a smart phone, a tablet personal computer (PC), a desktop computer, a notebook computer, and a user client and application running on each device, but the present invention is not limited thereto.

Hereinafter, the embodiments of the present invention will be described in detail with reference to the accompanying drawings.

Each operation described in this specification is described as being performed by a computer, but a subject of each operation is not limited thereto, and at least a portion of each operation may be performed in different devices according to embodiments.

FIG. 1 is a diagram illustrating a system for generating road network data for an autonomous driving vehicle according to an embodiment of the present invention.

Referring to FIG. 1, the system for generating road network data for an autonomous driving vehicle according to the embodiment of the present invention may include an apparatus 100 for generating road network data, a user terminal 200, and an external server 300.

Here, the system for generating road network data for an autonomous driving vehicle illustrated in FIG. 1 is a system according to an embodiment, and components of the system are not limited to those in the embodiment illustrated in FIG. 1 and may be added, changed, or removed as necessary.

In an embodiment, the apparatus 100 for generating road network data may generate road network data including road graphs generated by graphing a plurality of roads included in a predetermined area.

For example, the apparatus 100 for generating road network data may generate a plurality of roads by grouping a plurality of unit lanes included in a predetermined area according to a preset road generation rule, generate a road graph corresponding to each of the one or more roads by graphing each of the generated one or more roads, and generate road network data for the predetermined area by connecting and combining the road graphs corresponding to the one or more roads. However, the present invention is not limited thereto.

In various embodiments, the apparatus 100 for generating road network data may automatically generate one or more roads for generating road network data according to an image data analysis result generated by analyzing image data (e.g., image data (e.g., a high-precision map) including a plurality of unit lanes) collected from the outside and according to the preset road generation rule.

In various embodiments, the apparatus 100 for generating road network data may generate one or more roads by grouping a plurality of unit lanes according to a user input. For example, the apparatus 100 for generating road network data may be connected to the user terminal 200 through a network 400 and may provide a road network data-generating user interface (UI), through which one or more roads may be generated, by grouping a plurality of unit lanes based on a high-precision map.

Here, the one or more roads are a set of unit lanes in which vehicles freely travel and may refer to a cluster group including lines, points, and a set of lanes. However, the present invention is not limited thereto.

Further, the apparatus 100 for generating road network data may generate one or more roads by grouping the plurality of unit lanes according to a user input which is input through the road network data-generating UI. However, the present invention is not limited thereto.

In various embodiments, the apparatus 100 for generating road network data may be connected to the external server 300 (e.g., a server that determines a control command for an autonomous driving vehicle) through the network 400 and may provide the road network data which is information necessary for determining the control command for the autonomous vehicle in the external server 300.

In an embodiment, the user terminal 200 may be connected to the apparatus 100 for generating road network data through the network 400 and may receive various types of data (e.g., the road network data) provided by the apparatus 100 for generating road network data or may be provided with a UI (e.g., the road network data-generating UI) provided by the apparatus 100 for generating road network data.

In various embodiments, the user terminal 200 may include at least one of a smartphone, a tablet PC, a desktop computer, and a notebook computer, which have a display on at least a portion of the user terminal 200, and may output various types of data and various types of UIs, which are received through a display or provided by the apparatus 100 for generating road network data. However, the present invention is not limited thereto.

In an embodiment, the external server 300 may be connected to the apparatus 100 for generating road network data through the network 400 and may provide various types of data and information (e.g., map image data, road network data generating rule, etc.) necessary for the apparatus 100 for generating road network data to perform an operation of generating road network data.

In various embodiments, the external server 300 may be provided inside the apparatus 100 for generating road network data or may be a storage server which is separately provided outside the apparatus 100 for generating road network data, and the external server 300 may store and manage the road network data generated by the apparatus 100 for generating road network data. However, the present invention is not limited thereto. Hereinafter, a hardware configuration of an apparatus 100 for generating road network data which is capable of performing an operation of generating road network data will be described with reference to FIG. 2.

Figure 2:
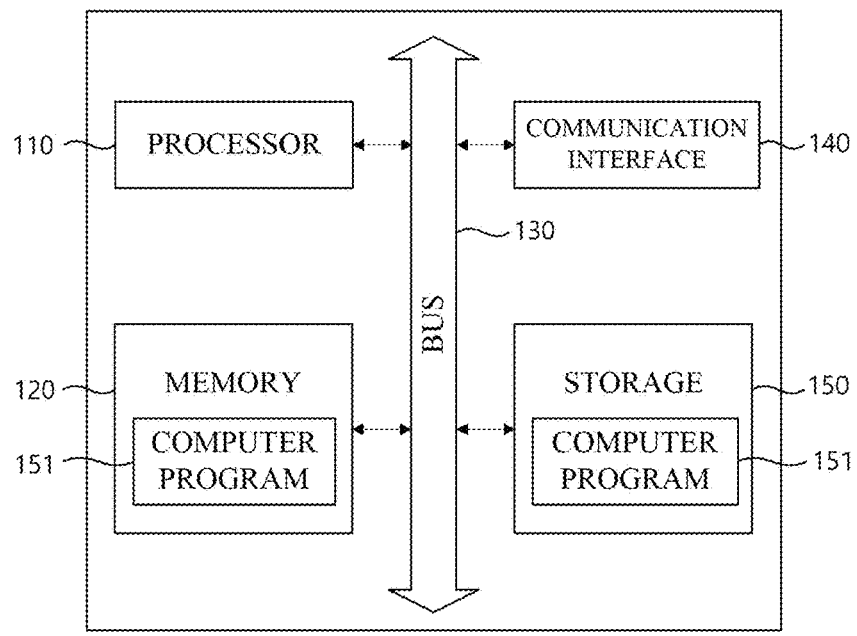
FIG. 2 is a hardware configuration diagram of an apparatus for generating road network data for an autonomous driving vehicle according to another embodiment of the present invention.

FIG. 2 is a hardware configuration diagram of an apparatus for generating road network data for an autonomous driving vehicle according to another embodiment of the present invention.

Referring to FIG. 2, an apparatus 100 (hereinafter, referred to as a "computing device 100") for generating road network data according to another embodiment of the present invention may include one or more processors 110, a memory 120 for loading a computer program 151 executed by the processor 110, a bus 130, a communication interface 140, and a storage 150 for storing the computer program 151.

Here, only the components related to the embodiment of the present invention are illustrated in FIG. 2. Therefore, it can be seen by those skilled in the art to which the present invention pertains that other general-purpose components excluding the components illustrated in FIG. 2 may be further included.

The processor 110 controls the overall operation of each component of the computing device 100. The processor 110 may include a central processing unit (CPU), a microprocessor unit (MPU), a micro controller unit (MCU), a graphics processing unit (GPU), or any type of processor well known in the art to which the present invention pertains.

Further, the processor 110 may perform an operation for at least one application or program for executing methods according to embodiments of the present invention, and the computing device 100 may include one or more processors.

In various embodiments, the processor 110 may further include a random-access memory (RAM) (not illustrated) and a read-only memory (ROM) (not illustrated) for temporarily and/or permanently storing signals (or data) to be processed inside the processor 110. Further, the processor 110 may be implemented in the form of a system on a chip (SoC) including at least one of a GPU, a RAM, and a ROM.

The memory 120 is configured to store various types of data, commands, and/or information. The computer program 151 is loaded into the memory 120 from the storage 150 to execute methods/operations according to various embodiments of the present invention. When the computer program 151 is loaded into the memory 120, the processor 110 may perform the methods/operations by executing one or more instructions constituting the computer program 151. The memory 120 may be implemented as a volatile memory such as a RAM, but the technical scope of the present invention is not limited thereto.

The bus 130 provides a communication function between the components of the computing device 100. The bus 130 may be implemented as various types of buses such as an address bus, a data bus, a control bus, and the like.

The communication interface 140 supports wired/wireless Internet communication of the computing device 100. Further, the communication interface 140 may support various communication methods other than the Internet communication. To this end, the communication interface 140 may include a communication module well known in the art to which the present invention pertains. In some embodiments, the communication interface 140 may be omitted.

The storage 150 may be configured to non-temporarily store the computer program 151. When a process of generating road network data for an autonomous driving vehicle is performed through the computing device 100, the storage 150 may be configured to store various types of information necessary to perform the process of generating road network data for an autonomous driving vehicle.

The storage 150 may include a non-volatile memory such as a ROM, an erasable programmable ROM (EPROM), an electrically erasable programmable ROM (EEPROM), a flash memory, or the like, a hard disk, a removable disk, or any type of computer-readable recording medium well known in the art to which the present invention pertains.

The computer program 151 may include one or more instructions that, when loaded into the memory 120, cause the processor 110 to perform the methods/operations according to various embodiments of the present invention. That is, the processor 110 may perform the methods/operations according to various embodiments of the present invention by executing the one or more instructions.

In an embodiment, the computer program 151 may include one or more instructions that allow a method of generating road network data for an autonomous driving vehicle to be performed, wherein the method includes generating one or more roads by grouping a plurality of unit lanes, generating connection information about the one or more roads, and generating road network data including road graphs generated by graphing the one or more roads and reflecting the connection information on the graphed one or more roads. However, the present invention is not limited thereto.

The operations of the method or algorithm described in relation to the embodiment of the present invention may be implemented directly in hardware, may be implemented as a software module executed by hardware, or may be implemented by a combination thereof. The software module may reside in a RAM, a ROM, an EPROM, an EEPROM, a flash memory, a hard disk, a removable disk, a compact disc read-only memory (CD-ROM), or any type of computer-readable recording medium well known in the art to which the present invention pertains.

The components of the present invention may be implemented as a program (or application) in order to be executed in combination with a computer, which is hardware, and may be stored in a medium. The components of the present invention may be implemented as software programming or software components, and similarly, the embodiments may be implemented with programming or scripting languages such as C, C++, Java, assembler, etc., including various algorithms implemented as data structures, processes, routines, or combinations of other programming components. Technical aspects may be implemented with an algorithm to be executed by one or more processors. Hereinafter, a method of generating road network data for an autonomous driving vehicle performed by the computing device 100 will be described with reference to FIG. 3.

Figure 3:
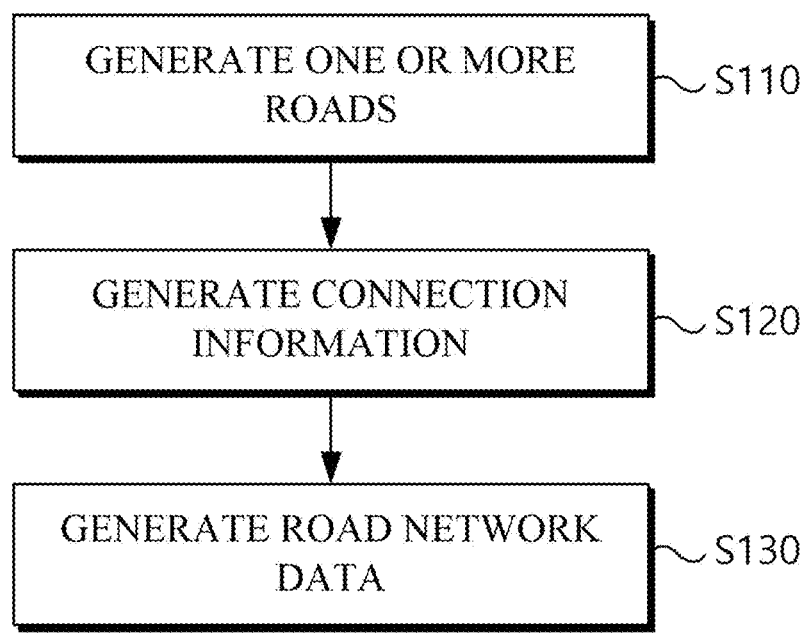
FIG. 3 is a flowchart of a method of generating road network data for an autonomous driving vehicle according to still another embodiment of the present invention.

FIG. 3 is a flowchart of a method of generating road network data for an autonomous driving vehicle according to still another embodiment of the present invention.

Referring to FIG. 3, in operation S110, the computing device 100 may generate one or more roads by grouping a plurality of unit lanes. For example, the computing device 100 may generate a plurality of roads by grouping a plurality of unit lanes according to a preset road generation rule (e.g., lane boundaries, a change in traveling route, etc.) (see FIG. 6).

In various embodiments, the computing device 100 may identify lane boundaries provided between the plurality of unit lanes and group the plurality of unit lanes according to attributes of the identified lane boundaries. Hereinafter, the above operation will be described with reference to FIG. 4.

Figure 4:
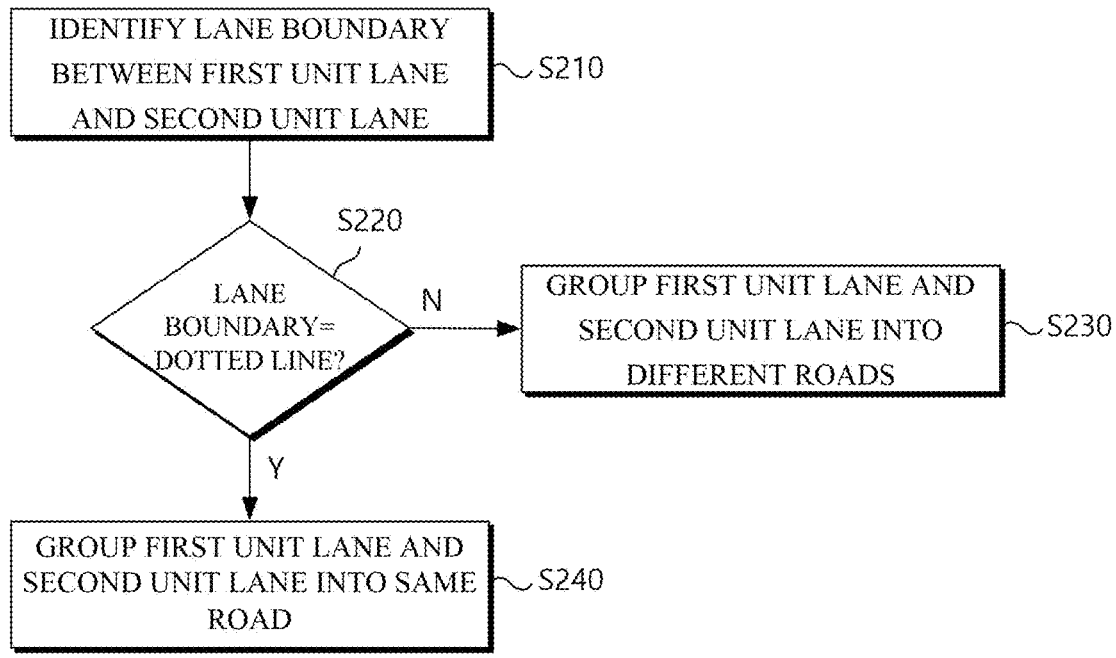
FIG. 4 is a flowchart of a method of grouping a plurality of unit lanes according to lane boundaries in various embodiments.

FIG. 4 is a flowchart of a method of grouping a plurality of unit lanes according to lane boundaries in various embodiments.

Referring to FIG. 4, in operation S210, the computing device 100 may analyze image data including a plurality of unit lanes to identify lane boundaries.

For example, the computing device 100 may identify the lane boundaries from the image data including the plurality of unit lanes by using a pre-trained artificial intelligence model, in which a plurality of pieces of image data (e.g., image data obtained by photographing a road, high-precision map image data included in lane boundary information, etc.) generated by photographing various types of objects located on the road, such as a plurality of unit lanes, lane boundaries, and the like, are pre-trained as learning data. However, the present invention is not limited thereto.

In operation S220, the computing device 100 may determine an attribute of the lane boundary identified in operation S210. Here, the attribute of the lane boundary may refer to a shape of the lane boundary. For example, the computing device 100 may determine whether the lane boundary identified from the image data including the plurality of unit lanes has a dotted-line shape or a solid-line shape. However, the present invention is not limited thereto.

In operation S230, when it is determined that the attribute of the lane boundary determined in operation S220 is a lane boundary (i.e., a lane boundary meaning no lane change is possible) in the form of a solid line, the computing device 100 may group the plurality of unit lanes such that a third unit lane and a fourth unit lane adjacent to each other based on the lane boundary in the form of the solid line are included in different roads.

That is, when it is determined that it is impossible to change lanes between the unit lanes because the lane boundary between the third unit lane and the fourth unit lane is formed as the solid line, the computing device 100 may group the plurality of unit lanes such that the corresponding unit lanes are included in different roads.

In operation S240, when it is determined that the attribute of the lane boundary determined in operation S220 is a lane boundary (i.e., a lane boundary meaning lane change is possible) in the form of a dotted line, the computing device 100 may group the plurality of unit lanes such that a first unit lane and a second unit lane adjacent to each other based on the lane boundary in the form of the dotted line are included in the same road.

That is, when it is determined that it is possible to change lanes between the unit lanes because the lane boundary between the first unit lane and the second unit lane is formed as the dotted line, the computing device 100 may group the plurality of unit lanes such that the corresponding unit lanes are included in the same road.

In various embodiments, the computing device 100 may group the plurality of unit lanes according to whether a change occurs in a traveling route of the vehicle with respect to each of the plurality of unit lanes. Hereinafter, the above operation will be described with reference to FIG. 5.

Figure 5:
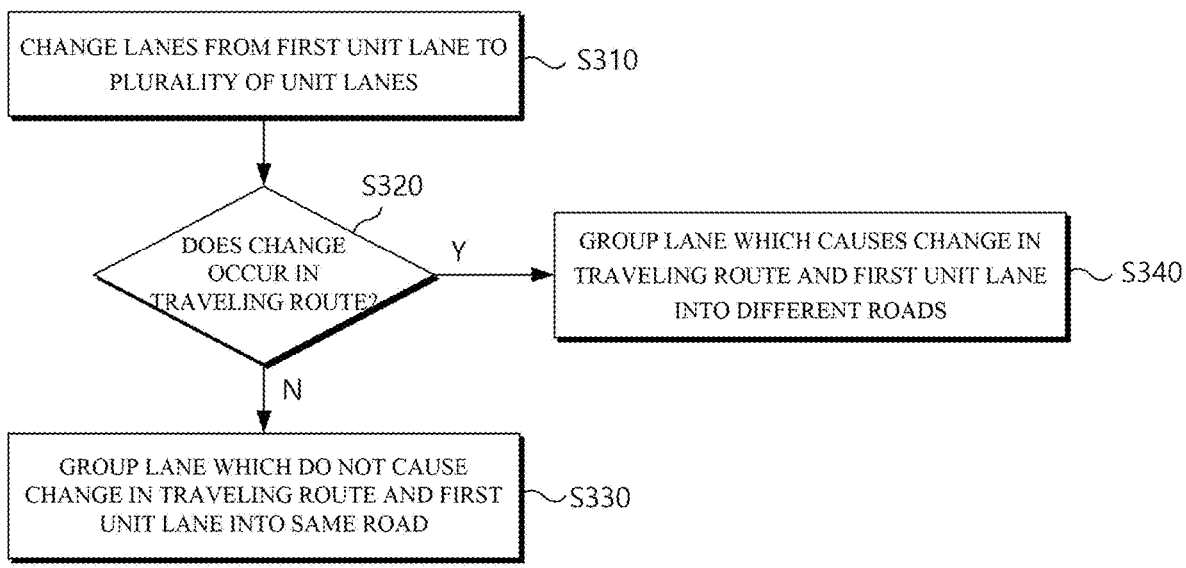
FIG. 5 is a flowchart of a method of grouping a plurality of unit lanes according to whether a traveling route is changed in various embodiments.

FIG. 5 is a flowchart of a method of grouping a plurality of unit lanes according to whether a traveling route is changed in various embodiments.

Referring to FIG. 5, in operation S310, the computing device 100 may allow a vehicle, which is located in a first unit lane among a plurality of unit lanes and travels along a preset traveling route, to change lanes from the first unit lane to each of the plurality of unit lanes.

Here, the computing device 100 may refer to controlling a vehicle which is located in a first unit lane to change to another lane in a virtual driving simulation, rather than controlling a vehicle that is actually being driven. However, the present invention is not limited thereto.

In operation S320, the computing device 100 may determine whether a change occurs in the preset traveling route when the vehicle changes lanes from the first unit lane to each of the plurality of unit lanes in operation S310.

For example, when a vehicle, which is located in a first unit lane in one road including the first unit lane, a second unit lane, and a third unit lane, changes lanes to each of the second unit lane and the third unit lane, the computing device 100 may determine whether a change occurs in a preset traveling route of the corresponding vehicle.

In operation S330, the computing device 100 may group one or more unit lanes, which do not cause a change in the preset traveling route, among the plurality of unit lanes and the first unit lane to be included in the same road.

For example, when the vehicle traveling on the first unit lane changes lanes to the second unit lane but a change does not occur in the preset traveling route, the computing device 100 may group the first unit lane and the second unit lane to be included in the same road.

In operation S340, the computing device 100 may group one or more unit lanes, which cause a change in the preset traveling route, among the plurality of unit lanes and the first unit lane to be included in different roads.

For example, when the vehicle traveling on the first unit lane changes lanes to the third unit lane and a change occurs in the preset traveling route, the computing device 100 may group the first unit lane and the third unit lane to be included in different roads. However, the present invention is not limited thereto.

In various embodiments, the computing device 100 may provide a road network data-generating UI capable of generating a road by grouping a plurality of unit lanes according to a request obtained from the user terminal 200 and may generate one road by grouping one or more unit lanes selected by the user through the road network data-generating UI.

For example, when a first unit lane, a second unit lane, and a third unit lane are selected by the user through the road network data-generating UI, the computing device 100 may group the first unit lane, the second unit lane, and the third unit lane into one road.

In various embodiments, the computing device 100 may obtain a user input indicating the exclusion of a specific unit lane included in a specific road from the user through the road network data-generating UI and may exclude the specific unit lane from the specific road according to the user input. However, the present invention is not limited thereto.

In various embodiments, the computing device 100 may group the plurality of unit lanes on the basis of attributes (e.g., a reference speed, a maximum speed, a minimum speed, direction information (straight, left turn, right turn, etc.), lane information (general lane, bus-only lane (all-day and peak-hour), etc.)) of each of the plurality of unit lanes.

When a specific lane has an attribute of a bus-only lane for a specific period of time, the autonomous driving vehicle cannot use the corresponding lane for a period of time set for the bus-only lane. Therefore, the computing device 100 may group only usable lanes among a plurality of lanes in consideration of the attribute of each of the plurality of lanes.

For example, when a first unit lane among a plurality of unit lanes included in a first road is a bus-only lane during a period from a first time to a second time, the computing device 100 may allow the first unit lane to be excluded from the first road during the period from the first time to the second time and allow the first unit lane to be included in the first road during a period excluding the period from the first time to the second time. However, the present invention is not limited thereto, and an attribute of the autonomous driving vehicle is also considered. When the attribute of the autonomous driving vehicle is a bus, the bus-only lane may also be included in the first road regardless of time.

Further, when it is determined that, because the second unit lane included in the first road has undergone repair work during a first period, the second unit lane cannot be used (e.g., when it is determined based on information related to road repair and maintenance collected from an external server (e.g., Road Traffic Corporation server)), the computing device 100 may allow the second unit lane to be excluded from the first road during the first period and allow the second unit lane to be included again in the first road after the first period has elapsed.

In various embodiments, the computing device 100 may identify one or more edges 4 indicating a road from a map image for a predetermined area and separate the one or more edges 4 from each other to extract two roads 4a and 4b (see FIG. 12) in which traveling directions of the vehicle are opposite to each other (longitudinal direction separation condition).

Figure 12:
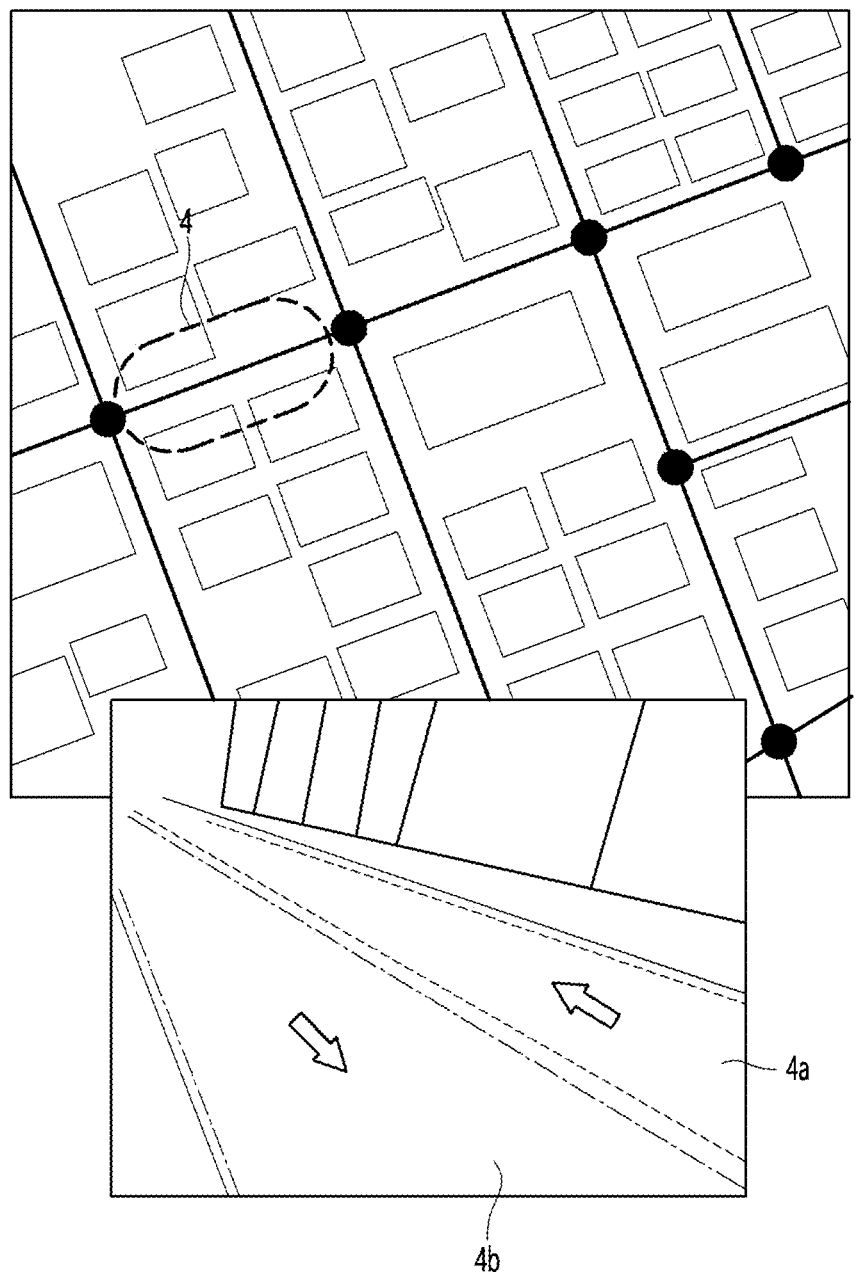
FIG. 12 is a diagram illustrating a configuration in which roads are extracted based on a map image in various embodiments.

All roads except for a road having a one-way attribute may include one or more first unit lanes on which vehicles are able to travel in a first direction and one or more second unit lanes on which vehicles are able to travel in a direction opposite to the first direction, as illustrated in FIG. 12.

In consideration of the above configuration, the computing device 100 may analyze an map image to identify one or more edges 4 indicating a road, and separate the identified one or more edges from each other in a longitudinal direction to extract two roads 4a and 4b, in which traveling directions of the vehicle are opposite to each other, for each of the identified one or more edges.

Accordingly, there is an advantage in that the computing device 100 may extract roads even from a general map (e.g., a map that does not include detailed information about roads such as unit lanes, lane boundaries, etc.) rather than a high-precision map.

Figure 6:
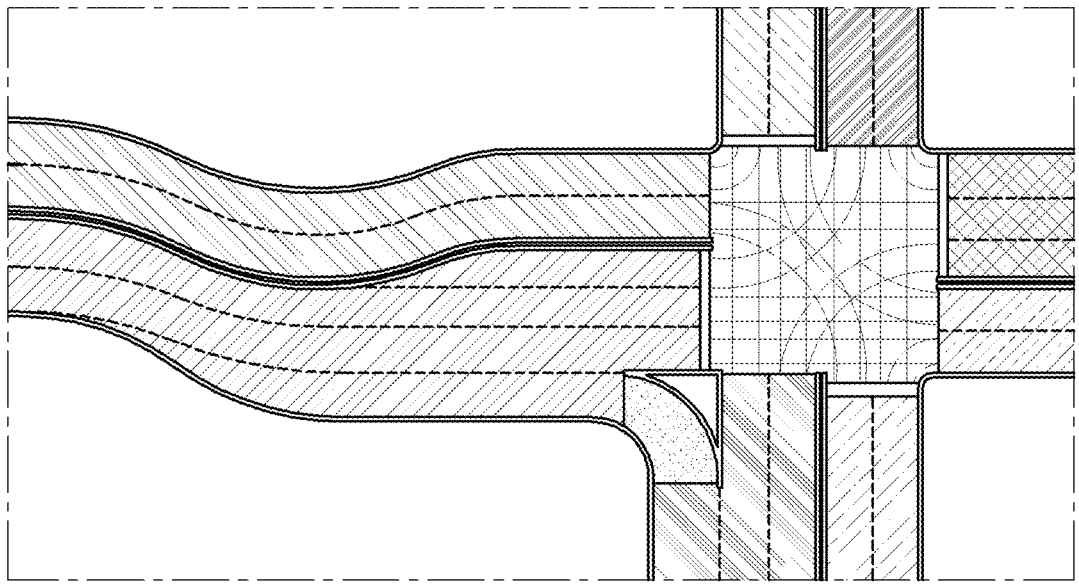
FIG. 6 is an exemplary diagram illustrating a plurality of roads generated by grouping a plurality of unit lanes included in a predetermined area in various embodiments.

The one or more roads generated according to the above procedure are illustrated in FIG. 6. Here, as illustrated in FIG. 6, a plurality of unit lanes included in the same road may be expressed in the same shade and different roads may be expressed in different shades.

In various embodiments, the computing device 100 may combine the plurality of roads into one or more road groups having the same traveling direction.

Figure 7:
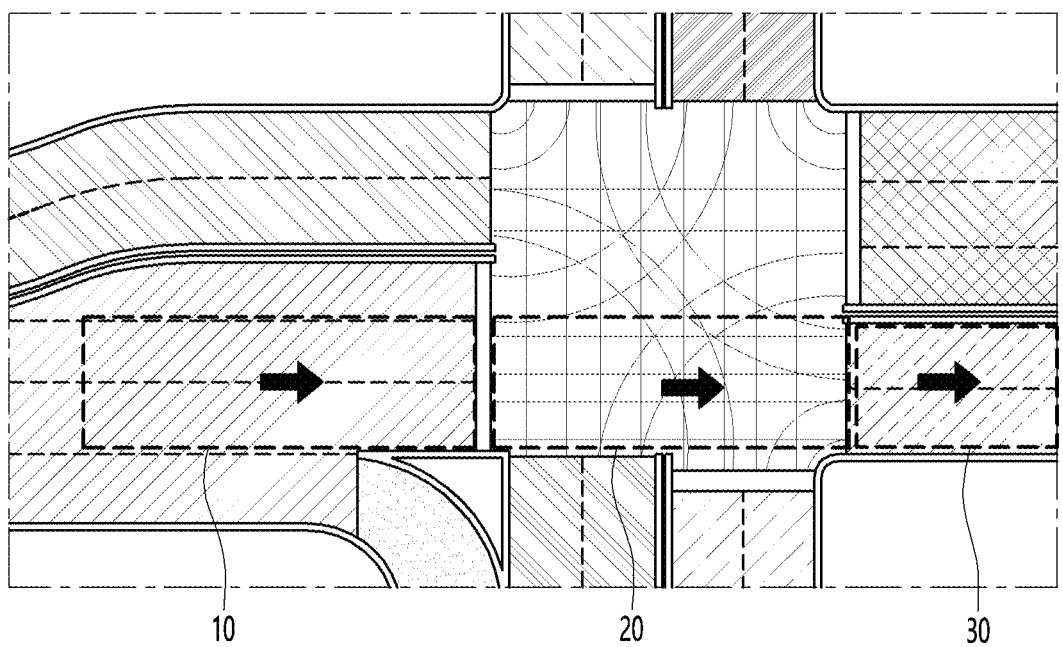
FIG. 7 is a diagram illustrating a process of grouping one or more roads in various embodiments.

For example, as illustrated in FIG. 7, the computing device 100 may determine whether a traveling direction of the vehicle on a first road 10 is the same as a traveling direction of the vehicle on a second road 20 connected to the first road 10, and when it is determined that the traveling directions of the vehicle are the same, the computing device 100 may group the first road 10 and the second road 20 into a first road group.

Thereafter, the computing device 100 may determine whether the traveling direction of the vehicle on the second road 20 is the same as a traveling direction of the vehicle on a third road 30 connected to the second road 20, and when it is determined that the traveling directions of the vehicle are the same, the computing device 100 may allow the third road 30 to be included in the first road group.

That is, the computing device 100 may sequentially group the roads into road groups in consideration of the traveling direction of each of the plurality of unit roads and the traveling direction of other roads connected to the plurality of unit roads.

Referring to FIG. 3 again, in operation S120, the computing device 100 may generate connection information about one or more roads generated by performing operation S110.

Here, when there are a plurality of travelable regions in one road, the computing device 100 may generate connection information for all the travelable regions.

In various embodiments, the computing device 100 may determine whether the vehicle is able to travel between the first road and the second road adjacent to the first road and may generate a connection information indicator between the first road and the second road according to the determination of whether travel is possible.

Further, the computing device 100 may display the connection information indicator indicating connection information between the first road and the second road on a portion in which the first road and the second road are connected. Hereinafter, the above operation will be described with reference to FIGS. 13 and 14.

Figure 13:
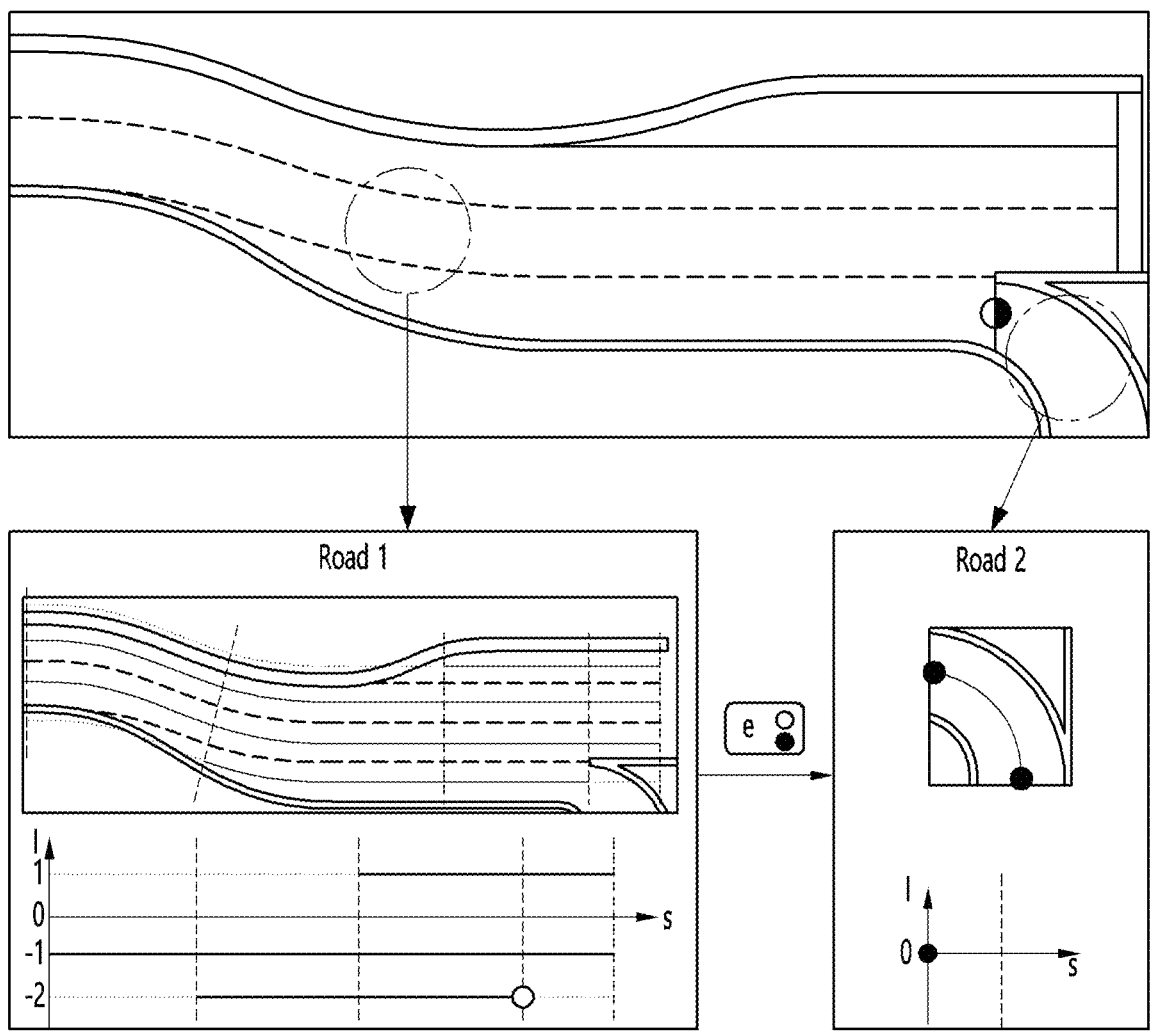
FIGS. 13 and 14 are diagrams illustrating configurations in which connection information is reflected on a road graph in various embodiments.

First, referring to FIG. 13, the computing device 100 may determine whether the vehicle is able to travel between a first road Road #1, which is a main road, and a second road Road #2 which is a small road, In this case, when it is determined that the vehicle is able to travel from the first road to the second road, the computing device 100 may generate a connection information indicator (e.g., a circle-shaped indicator having a preset color) indicating that travel is possible.

Here, the computing device 100 may arrange and display the connection information indicator on a road graph corresponding to each of the first road and the second road and may arrange and display connection information indicators having different attributes (e.g., color) on coordinates on a first road graph indicating a location (e.g., an entrance) where the vehicle may enter onto the second road from the first road and on coordinates on a second road graph indicating a location (e.g., an exit) where the vehicle may exit onto the second road from the first road, in consideration of directionality between the first road and the second road.

For example, the computing device 100 may arrange and display a blue circular indicator on coordinates (e.g., coordinates ($S_3$,−2)) on a first road graph indicating a location of an entrance, and may arrange and display a red circular indicator on coordinates (e.g., coordinates (0,0)) on a second road graph indicating a location of an exit. However, the present invention is not limited thereto.

Thereafter, when it is determined that the vehicle is not able to travel from the second road to the first road, the computing device 100 may not generate a connection information indicator indicating that travel is possible in a direction from the second road to the first road. However, the present invention is not limited thereto.

Figure 14:
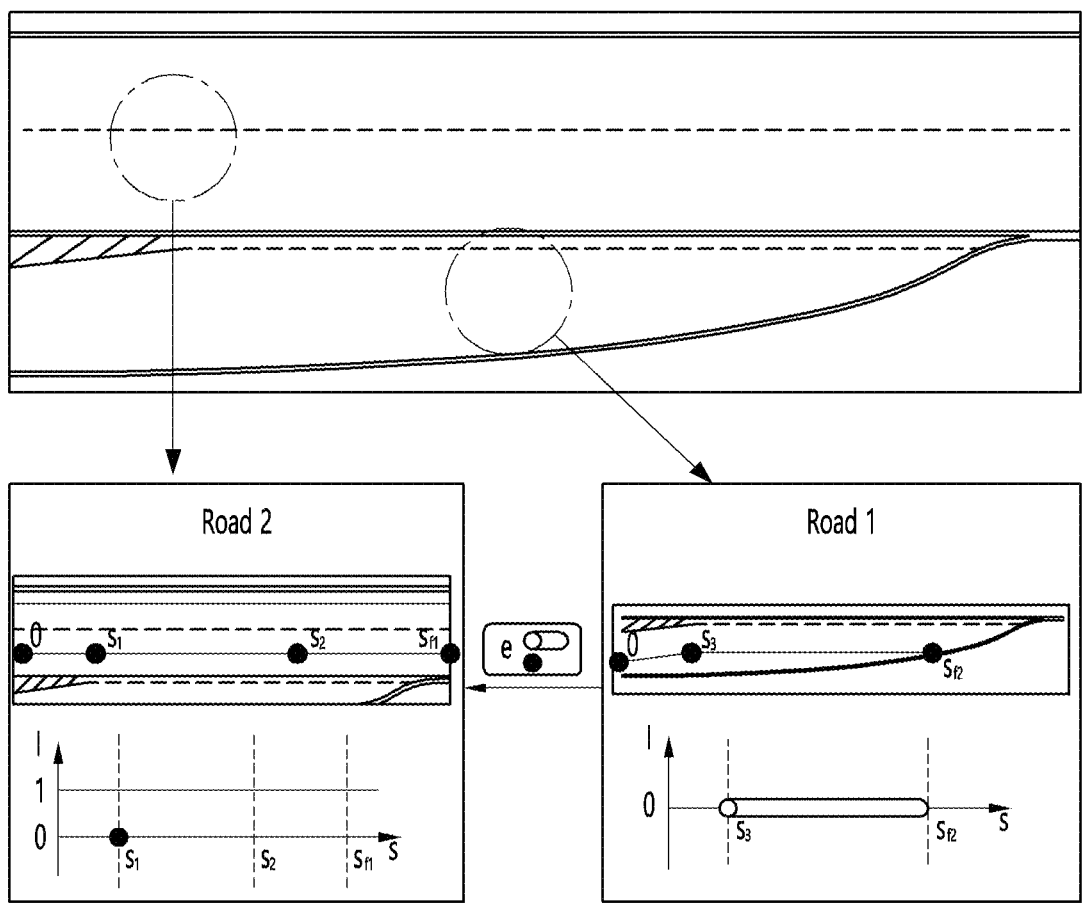
Figure 15A:
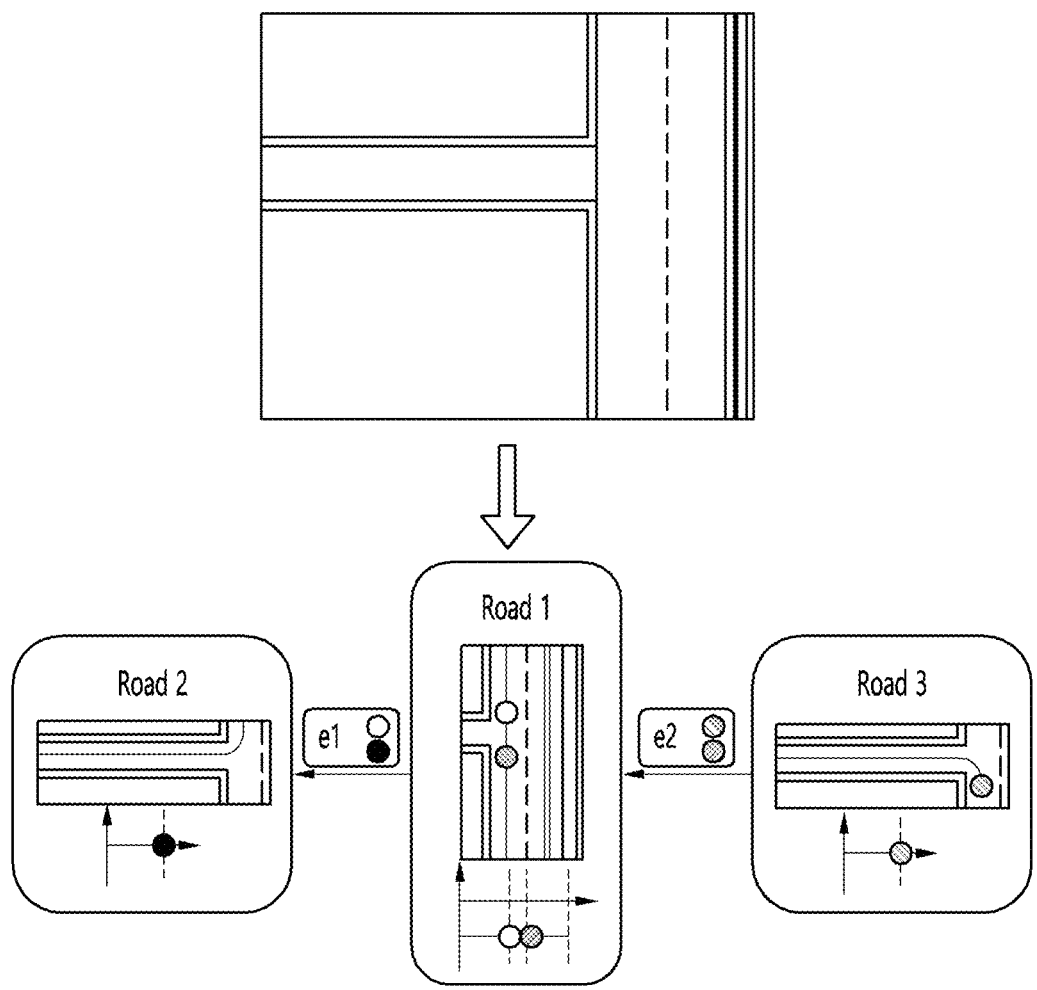
FIG. 15A is a diagram illustrating road network data for an alley formed with one unit lane, in which a vehicle is able to travel in both directions, in various embodiments.
Figure 15B:
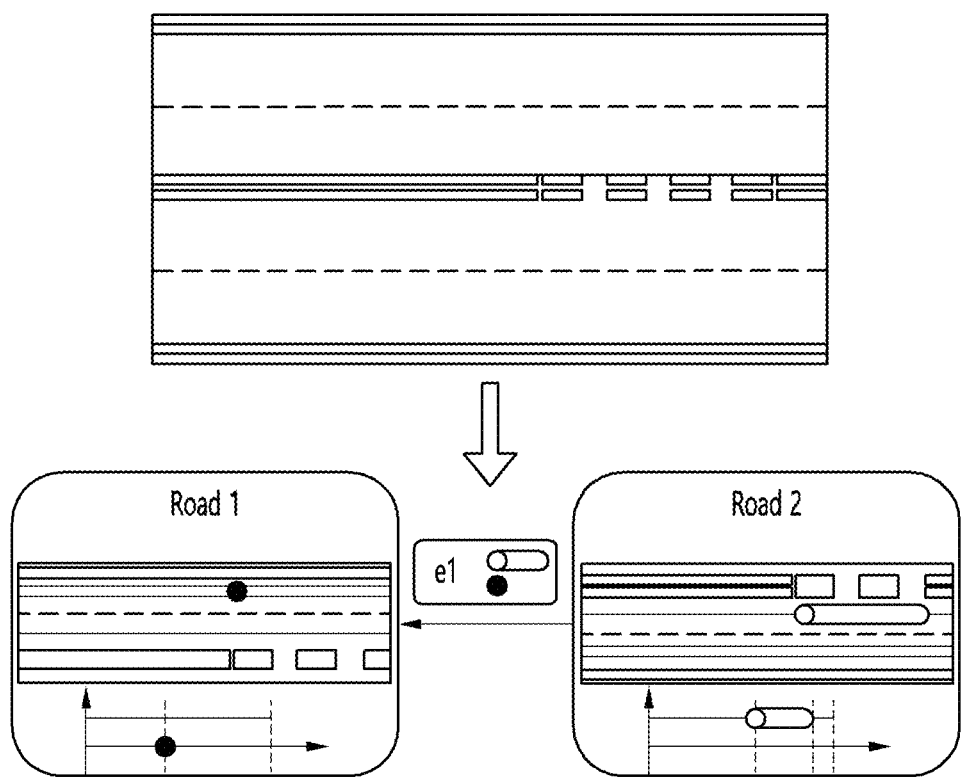
FIG. 15B is a diagram illustrating road network data for a road with a U-turn section in various embodiments.
Figure 15C:
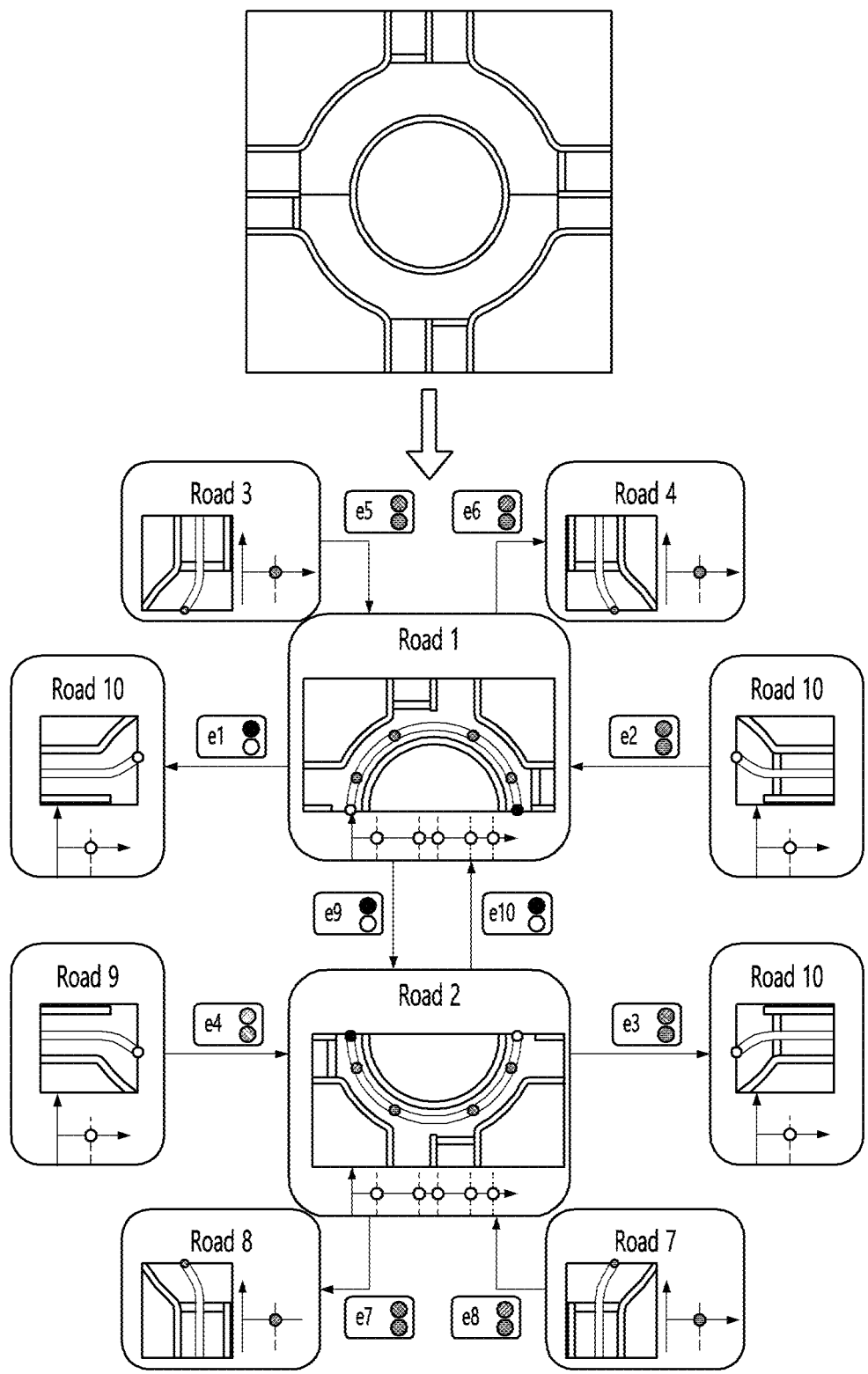
FIG. 15C is a diagram illustrating road network data for a road in the form of a roundabout in various embodiments.
Figure 15D:
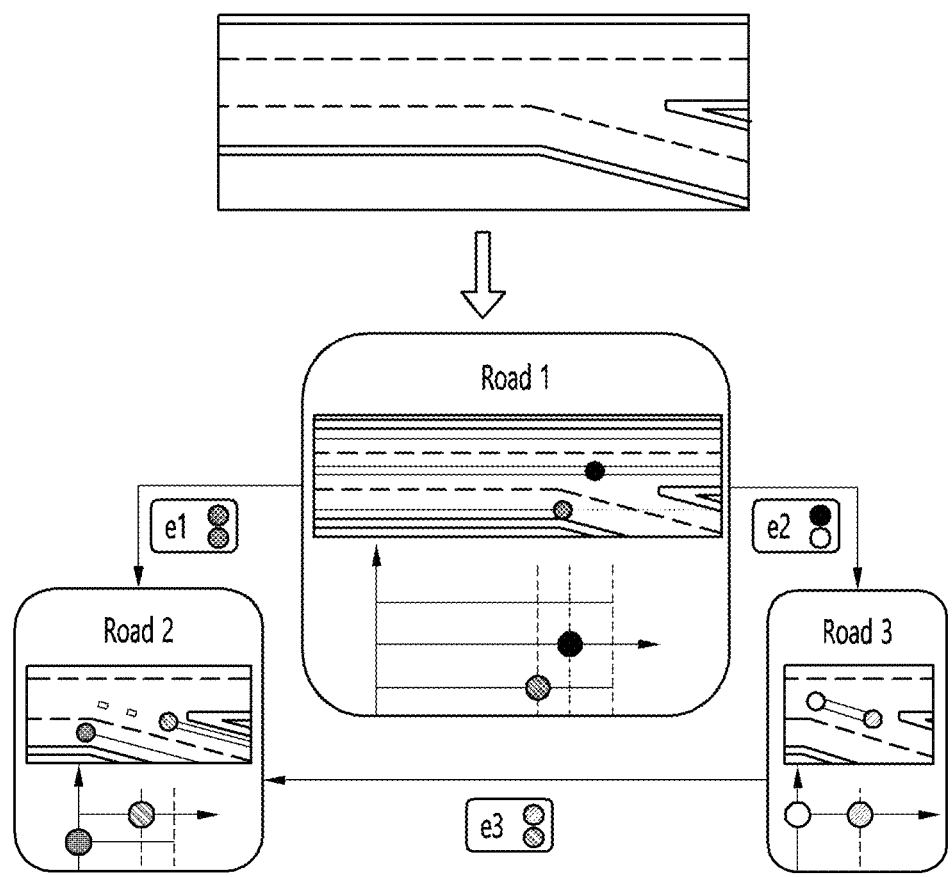
FIG. 15D is a diagram illustrating road network data for a divergence road in which a vehicle can enter a small road from a main road in various embodiments.
Figure 15E:
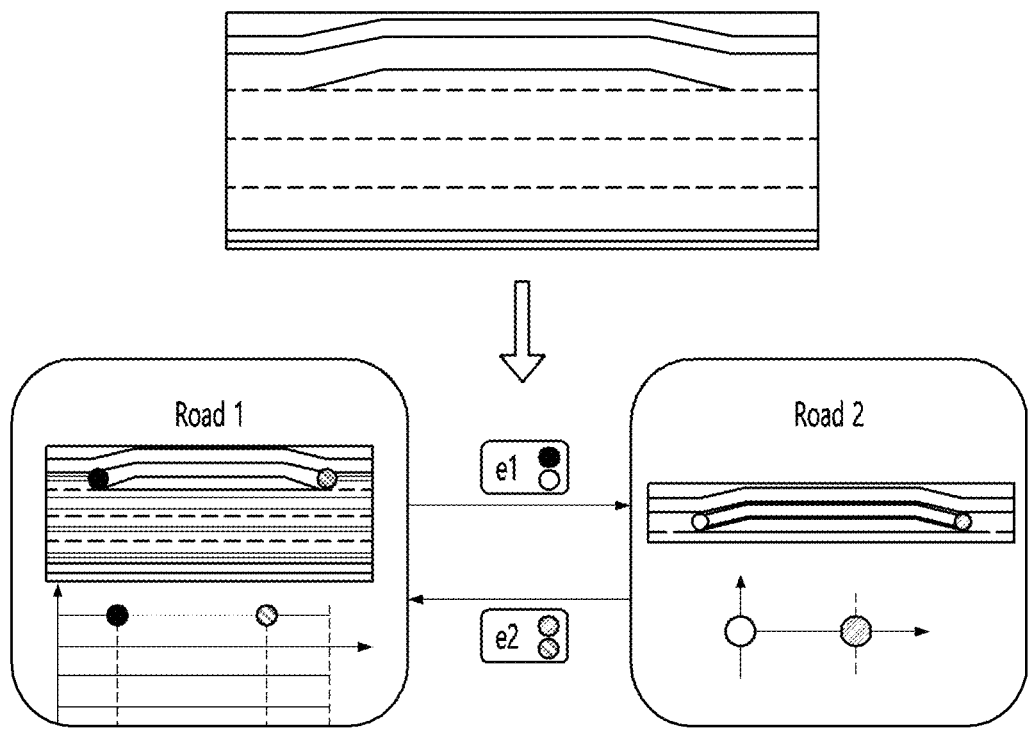
FIGS. 15E and 15F are diagrams illustrating road network data for roads provided with central bus stops in various embodiments.
Figure 15F:
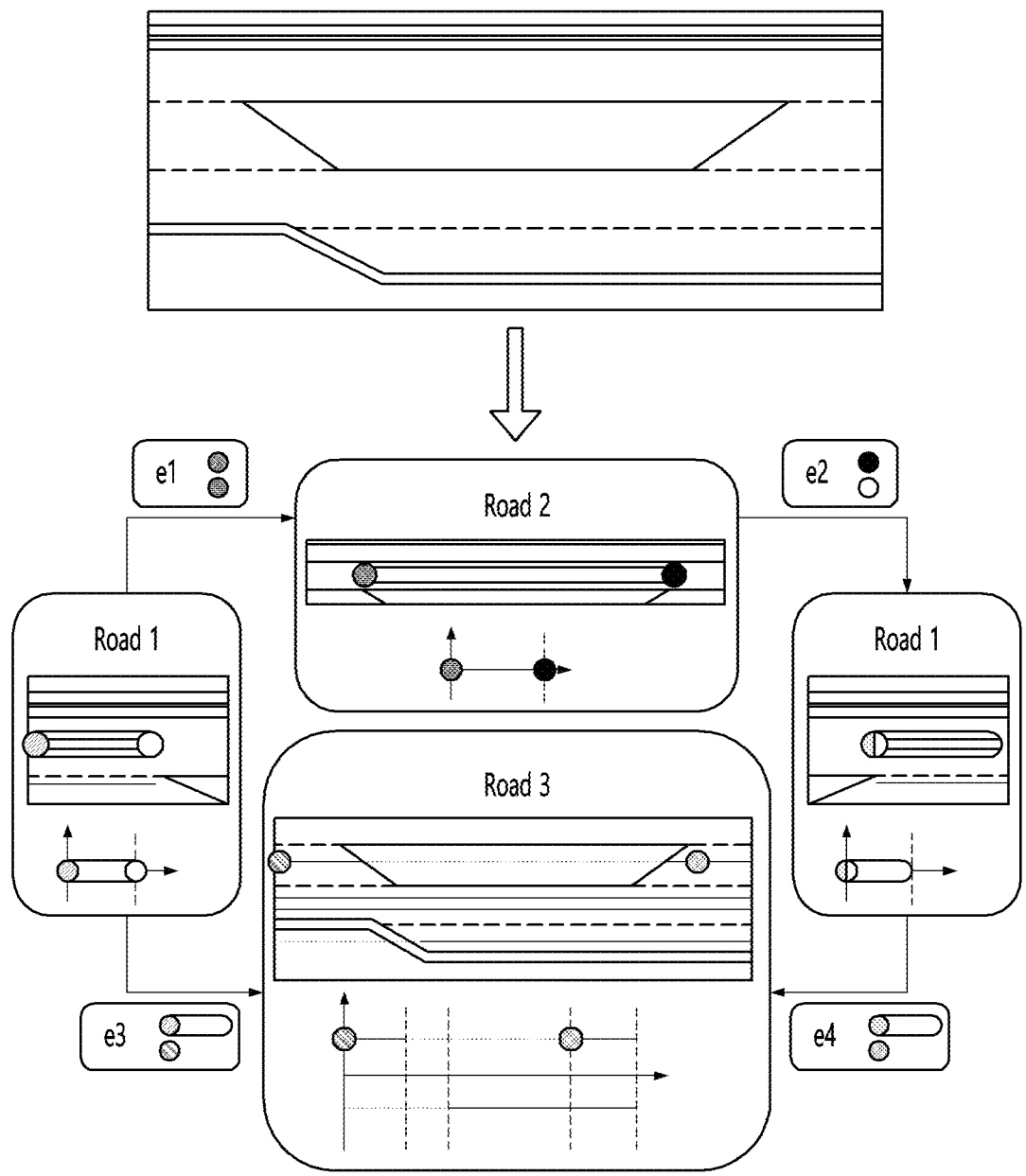
Figure 15G:
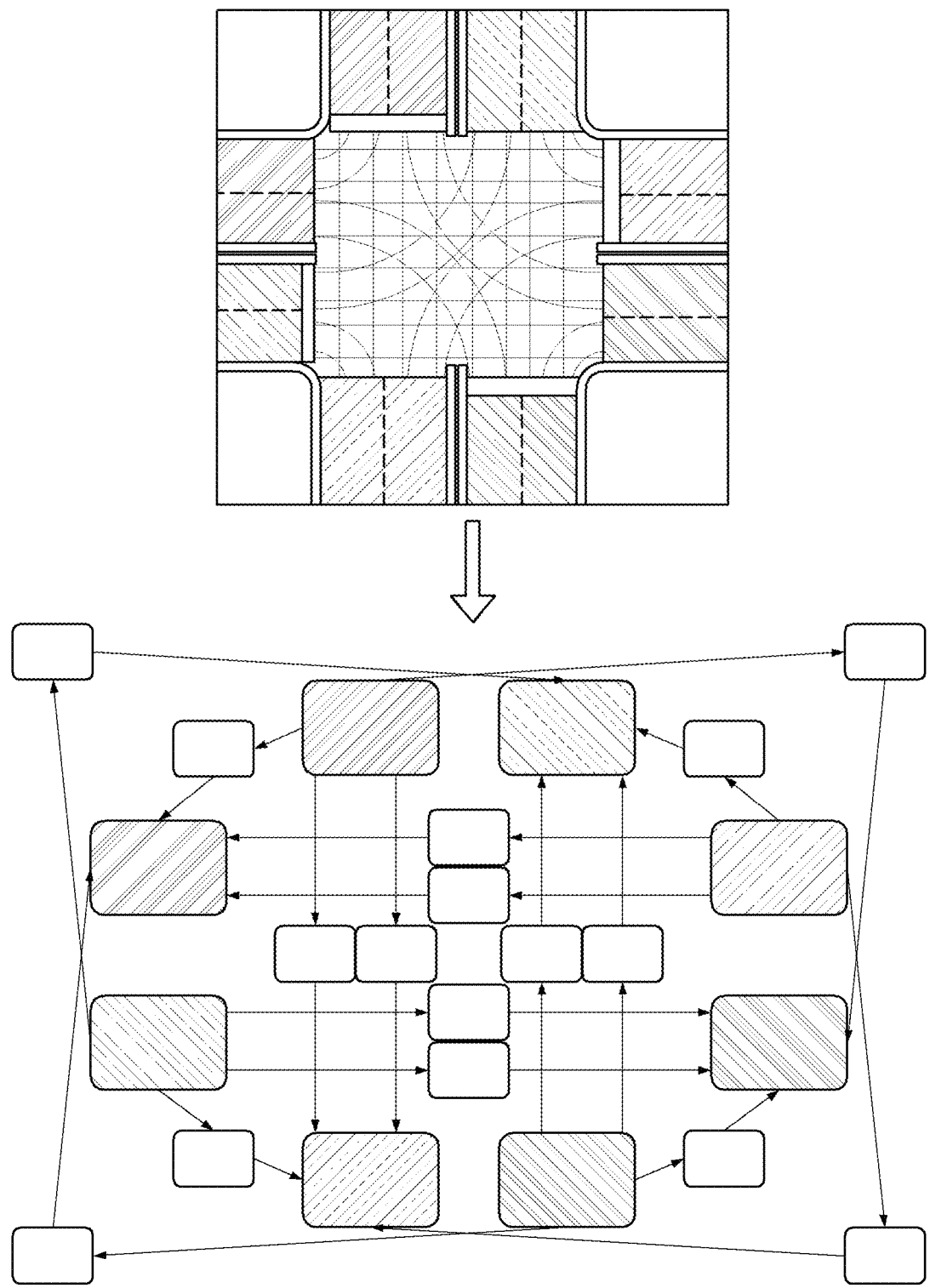
FIG. 15G is a diagram illustrating road network data for an intersection in various embodiments.

Next, referring to FIG. 14, the computing device 100 may determine whether travel is possible between a first road Road #1 and a second road Road #2.

Here, when it is determined that travel is possible from the first road to the second road, the computing device 100 may generate a connection information indicator (e.g., a blue circle-shaped indicator having a preset color) indicating that travel is possible.

In this case, when a portion in which travel is possible from the first road to the second road is formed as an area having a predetermined length rather than a single point, the computing device 100 may expand and display the connection information indicator indicating that travel is possible such that the connection information indicator may indicate a predetermined area in which travel is possible from the first road to the second road.

Here, the computing device 100 may arrange and display the connection information indicator on a road graph corresponding to each of the first road and the second road and may arrange and display connection information indicators having different attributes on an area on the first road graph indicating an area (e.g., an entrance) where the vehicle may enter onto the second road from the first road and on an area on the second road graph indicating an area (e.g., an exit) where the vehicle may exit onto the second road from the first road, in consideration of directionality between the first road and the second road.

For example, the computing device 100 may arrange and display an indicator in the form of an extended blue circle in coordinates (e.g., coordinates ($S_3$,0) to coordinates ($S_{f2}$,0) areas) on the first road graph indicating an entrance area, and may arrange and display a red circular indicator in coordinates (e.g., coordinates ($S_1$,0)) on the second road graph indicating an exit area. However, the present invention is not limited thereto.

Thereafter, when it is determined that travel is not possible from the second road to the first road, the computing device 100 may not generate a connection information indicator indicating that travel is possible in a direction from the second road to the first road. However, the present invention is not limited thereto.

Referring to FIG. 3 again, in operation S130, the computing device 100 may generate road network data including road graphs generated by graphing one or more roads and reflecting the connection information on the graphed one or more roads.

In various embodiments, the computing device 100 may generate the road graphs by graphing the one or more roads generated by performing operation S110 in the form of an S-L domain (e.g., a configuration of an L-axis in a longitudinal direction and an S-axis in a transverse direction (or an S-axis in the longitudinal direction and an L-axis in the transverse horizontal direction)). For example, the computing device 100 may graph each unit lane as a graph of an X-Y domain and generate a road graph of the S-L domain by converting the road graph of the X-Y domain into the S-L domain on the basis of position information composed of an x-coordinate and a y-coordinate for each of the plurality of unit lanes.

In this case, the computing device 100 may generate one or more road graphs corresponding to each of the one or more roads by graphing each of the one or more roads. Hereinafter, the above operation will be described with reference to FIGS. 8 and 9.

Figure 8:
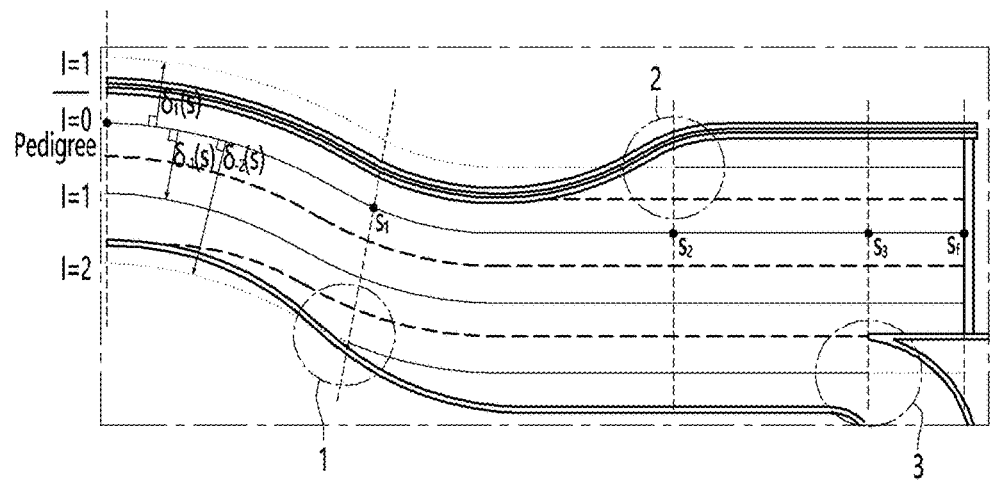
FIG. 8 is a diagram illustrating a process of graphing one or more roads in various embodiments.
Figure 9:
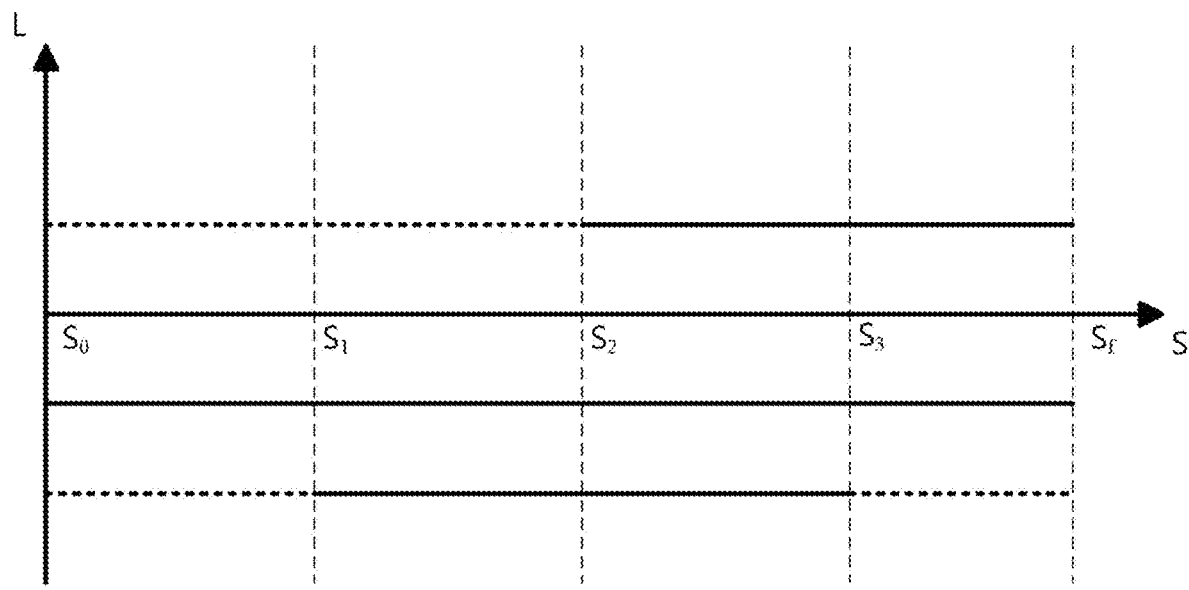
FIG. 9 is a diagram illustrating a road graph generated by graphing one or more roads in various embodiments.

FIG. 8 is a diagram illustrating a process of graphing one or more roads in various embodiments, and FIG. 9 is a diagram illustrating road graphs generated by graphing the one or more roads in various embodiments.

Referring to FIGS. 8 and 9, the computing device 100 may first select a reference unit lane from among a plurality of unit lanes included in a first road and connect from a start point $S_0$ of the selected reference unit lane to an end point $S_f$ of the reference unit lane with a straight line in the form of a solid line where $L=L_1$. For example, the computing device 100 may select a first unit lane from among the plurality of unit lanes included in the first road as the reference unit lane and connect from a start point $S_0$ of the first unit lane to an end point $S_f$ with a straight line in the form of a solid line where $L=0$.

Here, the straight line in the form of a solid line where $L=0$ may refer to a central portion of the first unit lane, which is the reference unit lane, but the present invention is not limited thereto.

Further, here, the computing device 100 may connect coordinates (0,$S_0$) of the start point of the reference unit lane and coordinates (0,$S_f$) of the end point of the reference unit lane using a cubic polynomial curvature path (CPCP) model to express a curve shape of a lane boundary.

With respect to a second unit lane adjacent to the first unit lane, the computing device 100 may connect from a start point $S_0$ of the second unit lane to an end point $S_f$ with a straight line in the form of a solid line where $L=L_2$. In this case, the computing device 100 may set a value of $L_2$ (e.g., $L=−1$) to be smaller than a value of $L_1$ in consideration of the second unit lane being located below the first unit lane, which is a reference unit lane on a graph of an S-L domain.

With respect to a third unit lane adjacent to the second unit lane, the computing device 100 may connect from a start point $S_1$ of the third unit lane to an end point $S_3$ with a straight line in the form of a solid line where $L=L_3$. In this case, the computing device 100 may set a value of $L_3$ (e.g., $L=−2$) to be smaller than a value of $L_2$ in consideration of the third unit lane being located below the second unit lane on the graph of the S-L domain.

Here, when the start point $S_1$ of the third unit lane is different from the start point $S_0$ of the first unit lane, that is, when the third unit lane is a unit lane which is newly generated from a specific position of the first road, the computing device 100 may display a section from $S_0$ to $S_1$ as a straight line in the form of a dotted line where $L=L_3$.

Further, when the end point $S_3$ of the third unit lane is different from the end points $S_f$ of the first unit lane and the second unit lane, that is, when the third unit lane is a unit lane disappearing in the middle of the first road, the computing device 100 may display a section from $S_3$ to $S_f$ as a straight line in the form of a dotted line where $L=L_3$.

With respect to a fourth unit lane adjacent to the first unit lane in a direction opposite to a direction of the second unit lane, the computing device 100 may connect a start point $S_2$ of the fourth unit lane and an end point $S_f$ with a straight line in the form of a solid line where $L=L_4$. In this case, the computing device 100 may set a value of $L_4$ (e.g., L=+1) to be greater than the value of $L_1$ in consideration of the fourth unit lane being located above the first unit lane on the graph of the S-L domain.

Here, when the start points $S_2$ of the fourth unit lane are different from the start point $S_0$ of the first unit lane, that is, when the fourth unit lane is a unit lane which is newly generated from the specific position of the first road, the computing device 100 may display a section from $S_0$ to $S_2$ as a straight line in the form of a dotted line where $L=L_4$.

In various embodiments, the computing device 100 may express each of the plurality of unit lanes in the form of a function of the S-L domain. For example, the computing device 100 may express the reference unit lane among the plurality of unit lanes as a function (e.g., a reference unit lane function) of the S-L domain and may functionally express the remaining unit lanes by reflecting distances separated from the reference unit lane function according to a distance separated from the reference unit lane. However, the present invention is not limited thereto.

In various embodiments, the computing device 100 may correct the road graphs in consideration of an area in which travel is actually possible for each of the plurality of unit lanes, or display information about the area in which the vehicle is actually able to travel on the road graph.

For example, referring to FIG. 8, with respect to an area in which a unit lane is newly generated on the first road, such as a first area 1 and a second area 2, in the case of a start point of the newly generated unit lane, the roads are provided so that travel is possible, but travel is often impossible in reality (e.g., in the case in which there is a median divider or a safety fence, or a safety zone is formed).

Further, in the case of a unit lane located on a route in which the vehicle travels from a main road to a small road, such as a third area 3, the roads on which the vehicle is able to travel are provided, but it is difficult to actually change lanes in the third section because a median divider or a safety zone is formed.

Figure 10:
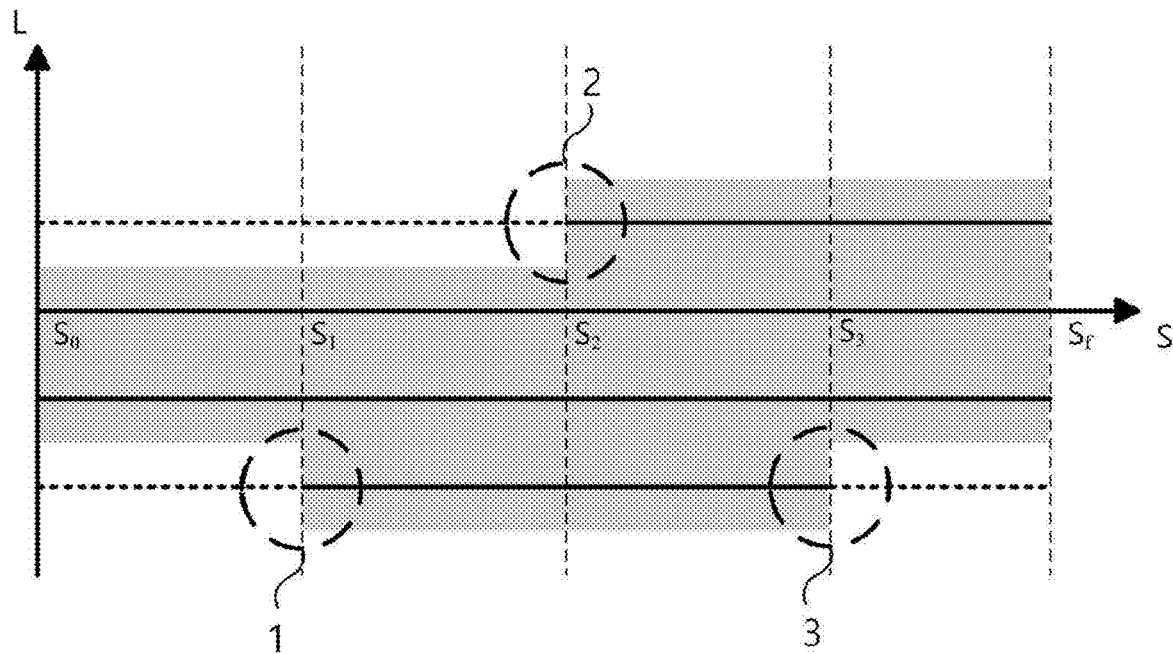
FIGS. 10 and 11 are exemplary diagrams illustrating configurations in which information about an area in which a vehicle is able to actually travel is displayed on a road graph on the basis of the area in which the vehicle is able to actually travel for a plurality of unit lanes included in one or more roads in various embodiments.
Figure 11:
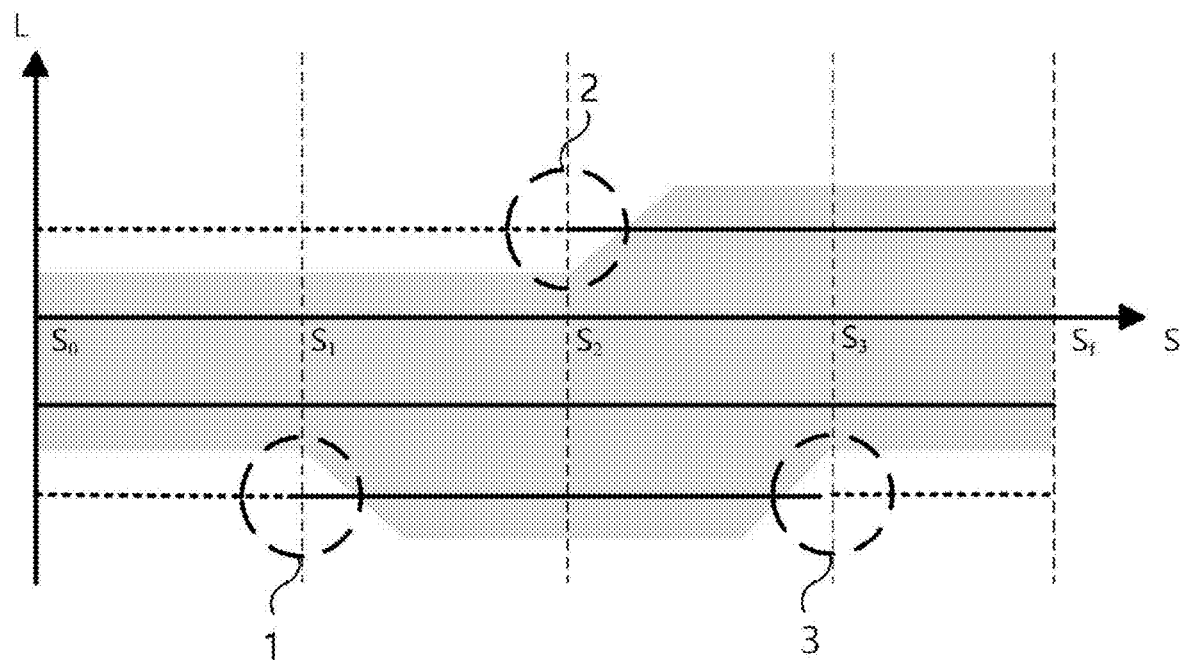

In consideration of the above, as illustrated in FIGS. 10 and 11, the computing device 100 may correct the road graphs corresponding to one or more roads (e.g., the lengths of the graphs displayed in the first area 1, the second area 2, and the third area 3 are corrected to be shortened) on the basis of the information about the area in which the vehicle is able to actually travel, or may display the information about the area in which the vehicle is able to actually travel on the road graph. However, the present invention is not limited thereto.

In various embodiments, the computing device 100 may generate road network data by reflecting the connection information generated by performing operation S120 on one or more road graphs corresponding to each of one or more roads.

The road network data generated according to the above procedure is illustrated in FIGS. 15A to 15G. However, the present invention is not limited thereto.

The above-described method of generating road network data for an autonomous driving vehicle has been described with reference to the flowcharts illustrated in the drawings. For a brief description, the method of generating road network data for an autonomous driving vehicle has been illustrated and described as a series of blocks, but the present invention is not limited to the order of the blocks, and some blocks may be performed in a different order from those illustrated and performed herein or may be performed simultaneously. In addition, new blocks that are not described in this specification and drawings may be added and performed or some blocks may be deleted or may be changed and performed.

According to various embodiments of the present invention, an autonomous driving system capable of generating road network data, which is prior information necessary for performing various purposes, such as providing a route to an autonomous driving vehicle and the like, that is, a method, an apparatus, and a computer program for generating road network data for an autonomous driving vehicle, can be provided.

Effects of the present invention are not limited to the above-described effects and other effects which have not been described may be clearly understood by those skilled in the art from the above descriptions.

While the embodiments of the present inventive concept have been described with reference to the accompanying drawings, it will be understood by those skilled in the art that various modifications can be made without departing from the scope of the present inventive concept and without changing essential features. Therefore, the above-described embodiments should be considered in a descriptive sense only and not for purposes of limitation.

REFERENCE NUMERALS

100: APPARATUS FOR GENERATING ROAD NETWORK DATA (OR COMPUTING DEVICE)
200: USER TERMINAL
300: EXTERNAL SERVER
400: NETWORK

What is claimed is:

1. A method of generating road network data for an autonomous driving vehicle, which is performed by a road network data generation system comprising a road network data generation apparatus, a user terminal device, and a server device, each of which includes a hardware processor and is connected with a network, the method comprising:
   receiving, by the road network data generation apparatus, via the network, data comprising at least one of map image data and a road network data generating rule, from the server device;
   generating, by the road network data generation apparatus, a road network data-generating user interface (UI) based on the data received from the server device;
   providing, by the road network data generation apparatus, through the network, the road network data-generating UI, to the user terminal;
   displaying, on the user terminal, the road network data-generating UI to receive a user input;
   receiving, by the road network data generation apparatus, through the network, from the user terminal, the user input which is input through the road network data-generating UI;
   generating, by the road network data generation apparatus, one or more roads by grouping a plurality of unit lanes according to the user input;
   generating, by the road network data generation apparatus, connection information about the one or more roads;
   determining whether a travel between a first road and a second road is allowed, which are adjacent to each other;
   generating a graphical connection information indicator when the travel is allowed;

generating, by the road network data generation apparatus, the road network data including road graphs generated by graphing the one or more roads and reflecting the connection information on the graphed one or more roads, wherein the road graphs include a first road graph corresponding to the first road and a second road graph corresponding to the second road, and the graphical connection information indicator positioned at a connection point of the first road and the second road; and providing, by the road network data generation apparatus, through the network, the generated road network data, to the server device.

2. The method of claim 1, wherein the generating of the one or more roads includes:

analyzing image data including the plurality of unit lanes and identifying a lane boundary;

in response to the identified lane boundary being a lane boundary in a form of a dotted line, grouping the plurality of unit lanes such that a first unit lane and a second unit lane adjacent to each other based on the lane boundary in the form of a dotted line are included in the same road; and in response to the identified lane boundary being a lane boundary in a form of a solid line, grouping the plurality of unit lanes such that a third unit lane and a fourth unit lane adjacent to each other based on the lane boundary in the form of a solid line are included in different roads.

3. The method of claim 1, wherein the generating of the one or more roads includes:

when a vehicle is located in a first unit lane among the plurality of unit lanes and travels along a preset traveling route and when the vehicle changes lanes from the first unit lane to each of the plurality of unit lanes, determining whether a change occurs in the preset traveling route; and grouping one or more of the unit lanes, in which a change in the preset traveling route does not occur among the plurality of unit lanes, and the first unit lane to be included in the same road and grouping one or more unit lanes, in which a change occurs in the preset traveling route, among the plurality of unit lanes, and the first unit lane to be included in different roads.

4. The method of claim 1, wherein the generating of the one or more roads includes:

obtaining a map image for a predetermined area;

analyzing the map image and identifying one or more road edges indicating the road; and separating the identified one or more edges from each other in a longitudinal direction and extracting two roads in which traveling directions of a vehicle are opposite to each other for each of the identified one or more edges.

5. The method of claim 1, wherein the generating of the one or more roads includes grouping the plurality of unit lanes on the basis of attributes of the plurality of unit lanes, wherein the grouping of the plurality of unit lanes includes, when a first unit lane among the plurality of unit lanes included in a first road is a bus-only lane during a period from a first time to a second time, allowing the first unit lane to be excluded from the first road during the period from the first time to the second time and allowing the first unit lane to be included in the first road during a period excluding the period from the first time to the second time.

6. The method of claim 1, wherein the generating of the one or more roads includes:

determining whether a traveling direction of a vehicle in a first road is the same as a traveling direction of the vehicle in a second road connected to the first road, and when it is determined that the traveling directions of the vehicle are the same, grouping the first road and the second road as a first road group; and determining whether the traveling direction of the vehicle in the second road is the same as a traveling direction of the vehicle in a third road connected to the second road, and when it is determined that the traveling direction of the vehicle are the same, allowing the third road to be included in the first road group.

7. The method of claim 1, wherein the generating of the road network data includes generating road graphs including an L-axis in a longitudinal direction and an S-axis in a transverse direction for the one or more roads, wherein the generating of the road graphs includes:

selecting a reference unit lane from among the plurality of unit lanes included in a first road and connecting a start point (S0) of the selected reference unit lane to an end point (Sf) of the reference unit lane with a straight line in a form of a solid line where L=L1; and connecting a start point (S1) of a first unit lane adjacent to the reference unit lane to an end point (Sf) of the first unit lane with a straight line in a form of a solid line where L=L2, wherein, when a size of S coordinates of the start point (S1) of the first unit lane is greater than a size of S coordinates of the start point (S0) of the reference unit lane, displaying a section from S0 to S1 on the straight line where L=L2 with a straight line in a form of a dotted line.

8. The method of claim 1, wherein the generating of the road network data includes:

obtaining information about areas in which a vehicle is allowed to actually travel with respect to the plurality of unit lanes included in the one or more roads; and correcting the road graphs corresponding to the one or more roads on the basis of the information about the areas in which the vehicle is allowed to actually travel or displaying the information about the areas in which the vehicle is allowed to actually travel on the road graphs.

9. A device for generating road network data for an autonomous driving vehicle, the device comprising:

a memory configured to store one or more instructions; and a processor configured to execute the one or more instructions stored in the memory, wherein the processor executes the one or more instructions to perform:

receiving, via a network, data comprising at least one of map image data and a road network data generating rule, from a server device;

generating a road network data-generating user interface (UI) based on the data received from the server device;

providing, through the network, the road network data-generating UI, to a user terminal;

controlling the user terminal to display the road network data-generating UI configured to receive a user input;

receiving, through the network, from the user terminal, the user input which is input through the road network data-generating UI;

generating one or more roads by grouping a plurality of unit lanes according to the user input;

generating connection information about the one or more roads;
determining whether a travel between a first road and a second road is allowed, which are adjacent to each other;
generating a graphical connection information indicator when the travel is allowed;
generating the road network data including road graphs generated by graphing the one or more roads and reflecting the connection information on the graphed one or more roads,
wherein the road graphs include a first road graph corresponding to the first road and a second road graph corresponding to the second road, and the graphical connection information indicator positioned at a connection point of the first road and the second road; and
providing through the network, the generated road network data, to the server device.

10. A non-transitory computer-readable recording medium storing a program for generating road network data for an autonomous driving vehicle, and configured to be coupled to a road network data generation system comprising a road network data generation apparatus, a user terminal device, and a server device, each of which includes a hardware processor and is connected with a network, the program include instructions to execute a method comprising:
   receiving, by the road network data generation apparatus, via the network, data comprising at least one of map image data and a road network data generating rule, from the server device;
   generating, by the road network data generation apparatus, a road network data-generating user interface (UI) based on the data received from the server device;
   providing, by the road network data generation apparatus, through the network, the road network data-generating UI, to the user terminal;
   displaying, on the user terminal, the road network data-generating UI to receive a user input;
   receiving, by the road network data generation apparatus, through the network, from the user terminal, the user input which is input through the road network data-generating UI;
   generating, by the road network data generation apparatus, one or more roads by grouping a plurality of unit lanes according to the user input;
   generating, by the road network data generation apparatus, connection information about the one or more roads;
   determining whether a travel between a first road and a second road is allowed, which are adjacent to each other;
   generating a graphical connection information indicator when the travel is allowed;
   generating, by the road network data generation apparatus, the road network data including road graphs generated by graphing the one or more roads and reflecting the connection information on the graphed one or more roads,
   wherein the road graphs include a first road graph corresponding to the first road and a second road graph corresponding to the second road, and the graphical connection information indicator positioned at a connection point of the first road and the second road; and
   providing, by the road network data generation apparatus, through the network, the generated road network data, to the server device.

* * * * *